United States Patent [19]

Hoashi et al.

[11] Patent Number: 4,870,582
[45] Date of Patent: Sep. 26, 1989

[54] ANTI-SKID BRAKE CONTROL SYSTEM

[75] Inventors: Akira Hoashi, Kawasaki; Hideo Akima, Yokohama; Katsuya Miyake, Ageo; Isao Yamaki, Iwatsuki, all of Japan

[73] Assignee: Fujitsu Limited, Kawasaki, Japan

[21] Appl. No.: 28,674

[22] Filed: Mar. 20, 1987

[30] Foreign Application Priority Data

Mar. 20, 1986 [JP] Japan ................................ 61-062432

[51] Int. Cl.$^4$ ................................................ B60T 8/32
[52] U.S. Cl. ................................ 364/426.02; 303/105; 180/197
[58] Field of Search .................... 364/426.02, 565, 566; 180/197; 303/92, 103, 105, 97, 99

[56] References Cited

U.S. PATENT DOCUMENTS

| 4,497,026 | 1/1985 | Braschel et al. | 364/426 |
| 4,665,490 | 5/1987 | Masaki et al. | 364/426 |
| 4,666,218 | 5/1987 | Masaki et al. | 364/426 |
| 4,670,852 | 6/1987 | Masaki et al. | 364/426 |
| 4,672,547 | 6/1987 | Masaki et al. | 364/426 |
| 4,673,226 | 6/1987 | Every et al. | 364/426 |
| 4,718,013 | 1/1988 | Kubo | 364/426 |

Primary Examiner—Gary Chin
Attorney, Agent, or Firm—Staas & Halsey

[57] ABSTRACT

An anti-skid brake control system for a motor vehicle comprises: a wheel speed sensor which is provided for each wheel of the vehicle and generates a pulse signal having a pulse cycle which corresponds to a revolutional speed of each wheel; a pulse cycle measuring circuit for detecting the cycle of the pulses of the pulse signal from each wheel speed sensor; and, a discriminator for discriminating an actual acceleration or deceleration state. The actual acceleration or deceleration state is discriminated in accordance with whether or not the period of the acceleration or deceleration state is longer than a predetermined time. The acceleration or deceleration state is calculated from the wheel speed data detected by the pulse cycle measuring circuit, and the system is controlled on the basis of the result of the discrimination by the discriminator.

6 Claims, 11 Drawing Sheets

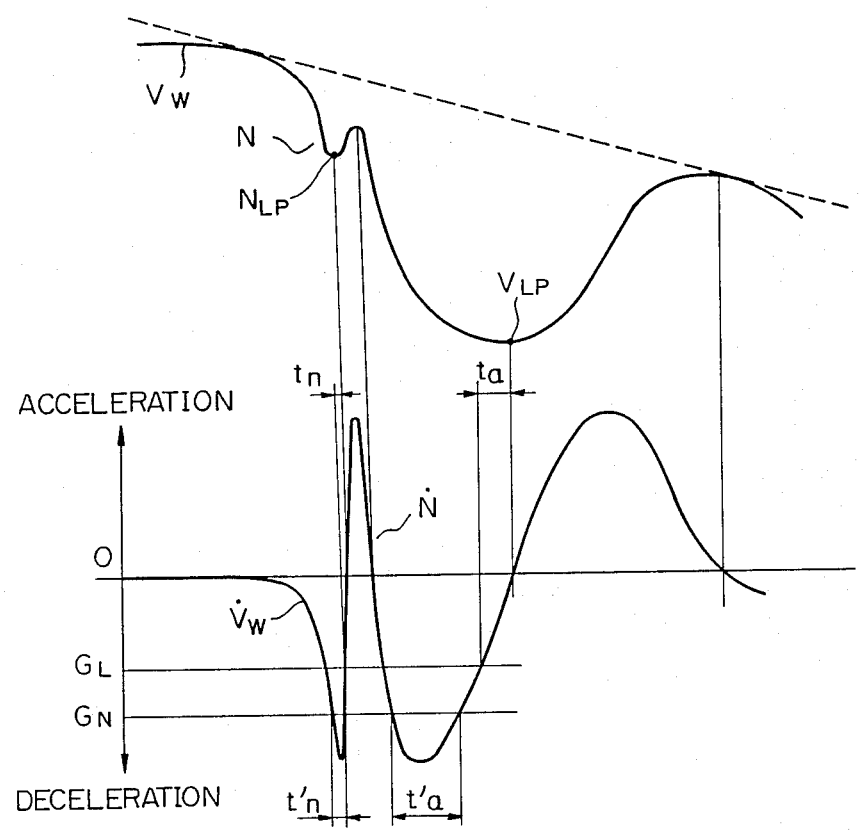

ANTI-SKID BRAKE CONTROL SYSTEM

CROSS-REFERENCE TO RELATED APPLICATIONS

This application is related to U.S. application Ser. No. 890,611 filed July 30, 1986 now U.S. Pat. No. 4,741,580 and assigned to the common assignees herein, that application furthermore claiming priority to Japanese Patent Application No. 60-170913 filed Aug. 2, 1985 and Japanese Patent Application No. 60-292997 filed Dec. 27, 1985, the Application No. 60-170913 moreover having been withdrawn in exchange and benefit for Japanese Patent Application No. 61-181350 filed Aug. 1, 1986 and claiming the priority date of the Application No. 60-170913. This application also si related to U.S. Ser. No. 028,544 now U.S. Pat. No. 4,825,371 and Ser. No. 028,543, filed on Mar. 20, 1987 to the common assignees herein.

BACKGROUND ON THE INVENTION

1. Field of the Invention

This invention relates to an anti-skid control system for achieving a satisfactory rotational behavior of the wheels of a motor vehicle during a braking operation. More particularly, this invention pertains to an anti-skid control system which is designed to increase and reduce brake fluid pressure in a desirable manner to prevent the wheels from becoming locked.

Especially, the present invention relates to a method for discriminating noise data from actual wheel velocity data for anti-skid brake control.

2. Description of the Related Art

There have been heretofore proposed a variety of anti-skid control systems wherein, during a braking operation, the brake fluid pressure is reduced to prevent the occurrence of an undesirable wheel lock, and the brake fluid pressure thus reduced is then increased to avoid a undesirable extension of the brake stopping distance. Among such conventional anti-skid control systems is one wherein different pressure buildup rates are stored; a desired one of the stored pressure buildup rates is selected; and brake fluid pressure is increased with the selected buildup rate, for example. To effect the pressure buildup rate selection, a system has been proposed, wherein a solenoid-operated valve adapted to be opened and closed with a relatively high frequency is provided in the brake fluid pressure buildup system; a pulse train generator such as a multivibrator is provided in the drive system for the solenoid-operated valve; and the timing with which the solenoid-operated valve is driven by a pulse train signal derived from the multivibrator is controlled on the basis of a signal representing wheel acceleration (British Patent Specification No. 1305430).

A conventional anti-skid brake control system comprises a wheel velocity detection means which is attached to the vehicle wheel axle and generates pulse signals corresponding to the wheel velocity. The wheel velocity is calculated based on the period of one cycle of the pulse signal and the result of the calculation is used to control the brake pressure.

The pulse signals from the wheel velocity detector are disturbed by the vibration from tires or by electric noise. An example of the output signal of the wheel velocity detector is represented in FIG. 4. As shown in the graph of FIG. 4, the wheel velocity may be mistakenly discriminated as an acceleration state, although actually in a deceleration state, due to the noise $N_A$. Conversely, the wheel velocity may be discriminated as a deceleration state although it is actually in an acceleration state, due to the noise $N_B$. Such a misjudgement will cause a malfunction of the anti-skid brake control system.

FIG. 5 shows a graph (i) of pulse signals from the wheel speed sensor and a graph (ii) of the output of the counter (cycle period detector) which represents pulses each having a width corresponding to one cycle of the pulse signal of graph (i). The above mentioned noise appears in the graph (i), which generates an unnecessary signal (n) having a period $t_3$, thus causing a malfunction of the system.

To avoid such a malfunction, an integral circuit has been used to modify and average the velocity curve, as represented by the dashed line in FIG. 4. However, the integral circuit can not effectively avoid the affect of noise having a large period. Also, a detection timing of the peaks of the wave signal is delayed due to the usage of the integral circuit, which degrades the reliability and stability of the anti-skid brake system.

SUMMARY OF THE INVENTION

An object of the present invention is to provide an anti-skid brake control system in which the above mentioned problems are alleviated by detecting the wheel velocity and calculating the acceleration or deceleration from the wheel velocity data, and then determining whether or not the calculated results of acceleration or deceleration represent an actual acceleration or deceleration state. The anti-skid brake system is controlled in accordance with the calculation results only when the calculation results are determined to represent the actual acceleration or deceleration state.

In accordance with the present invention, there is provided an anti-skid brake control system for a motor vehicle comprising: a wheel speed sensor which is disposed for each of the vehicle wheels and generates a pulse signal having a pulse cycle which corresponds to the revolutional speed of each wheel; a pulse cycle measuring circuit for detecting the cycle of the pulses of the pulse signal from the wheel speed sensor; and a discrimination means for discriminating an actual acceleration or deceleration state in accordance with whether or not the period of the acceleration or deceleration state is larger than a predetermined time. The acceleration or deceleration state is calculated from the wheel speed data detected by the pulse cycle measuring circuit and the system is controlled on the basis of the result of the discrimination by said discrimination means.

DESCRIPTION OF THE PREFERRED EMBODIMENTS

Figure 1:
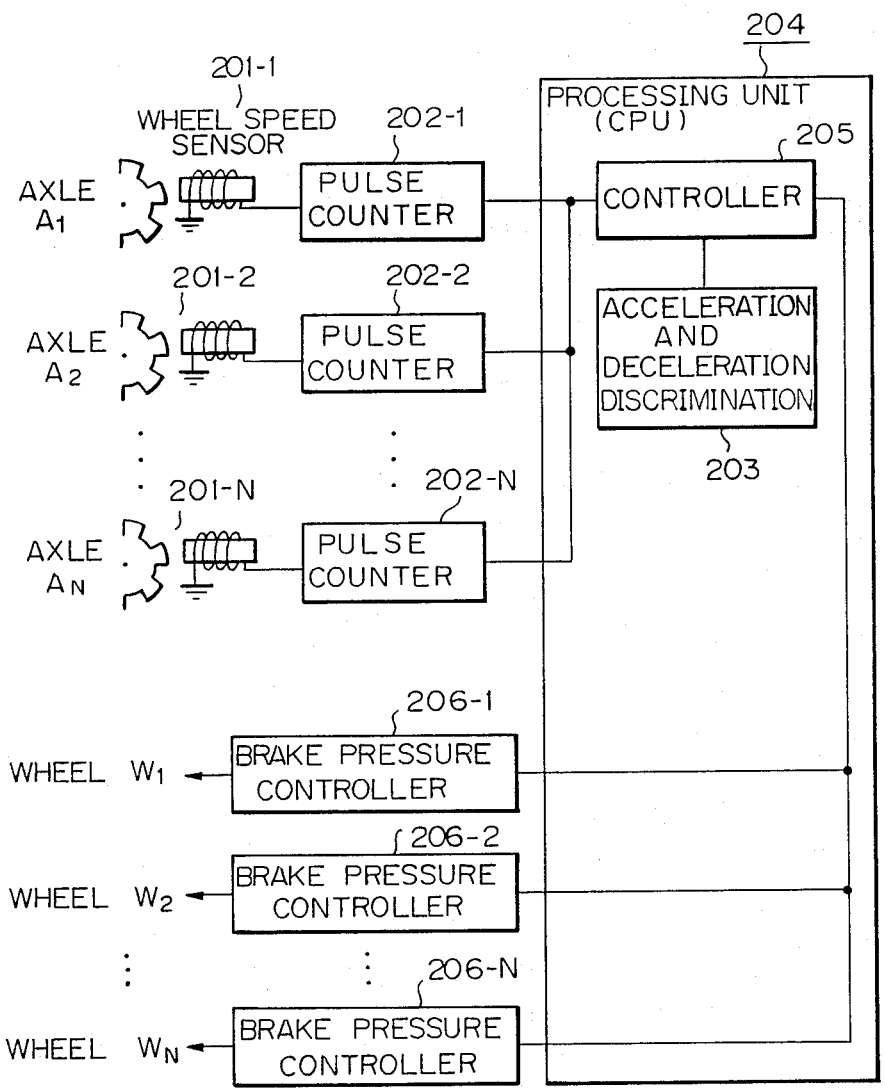
FIG. 1 is a constructional view of an anti-skid brake control system according to the present invention.

FIG. 1 illustrates an embodiment of the present invention which obviates afore-mentioned drawbacks of the prior art. Wheel speed sensors 201-1 to 201-N detect the revolutional speed of axles $A_1$ to $A_N$, respectively, which speed is represented as a cycle length of pulses. Note, usually N is 2 or 4. Pulse counters 202-1 to 202-N measure the wheel speed from the cycle of the pulse signal from the wheel speed sensors 201-1 to 201-N, respectively, as described in detail later. Acceleration or deceleration is calculated from the velocity data of the wheel speed measured by the pulse counters 202-1 to 202-N in a central processing unit (CPU) 204. An acceleration and deceleration discrimination means 203 determines whether or not the calculated acceleration or deceleration state is derived from an actual acceleration or deceleration state, in accordance with length of the period for which the calculated acceleration or deceleration state has continued. A controller 205 controls anti-skid brake controllers 206-1 to 206-N by a control signal in accordance with the wheel state calculated by the CPU and discriminated by the acceleration and deceleration discrimination means 203. The anti-skid brake controllers 206-1 to 206-N provide the brake drive system with brake pressure in accordance with the control signal and apply the brake force to the wheels $W_1$ to $W_N$, respectively.

In the structure of FIG. 1, the cycle of pulses of the pulse signal output from each of the wheel speed sensors 201-1 to 201-N is measured by the pulse counters 202-1 to 202-N to calculate the wheel velocity. The acceleration or deceleration of the wheel is then calculated on the basis of the calculated wheel velocity data and is transmitted to the acceleration and deceleration discrimination means 203 through the controller 205. The acceleration and deceleration discrimination means determines whether the calculated acceleration or deceleration data is genuine and effective data is derived from an actual acceleration or deceleration state if the calculated acceleration or deceleration state continues for more than a predetermined time. When the calculated data is determined to be genuine data, the controller transmits an optional control signal to the anti-skid brake controllers 206-1 to 206-N. The anti-skid brake controllers 206-1 to 206-N apply a braking force to the wheels $W_1$ to $W_N$ in accordance with the control signal to achieve a reliable anti-skid brake function.

As mentioned above, the acceleration or deceleration state calculated from the detected wheel velocity data is regarded as genuine data when the state continues for more than a predetermined time. Therefore, the calculated data based on noise, which usually continues for a very short time, is regarded as unnecessary data. Thus, it is possible to avoid a malfunction of the anti-skid brake control system due to noise in the wheel velocity data.

Figure 6:
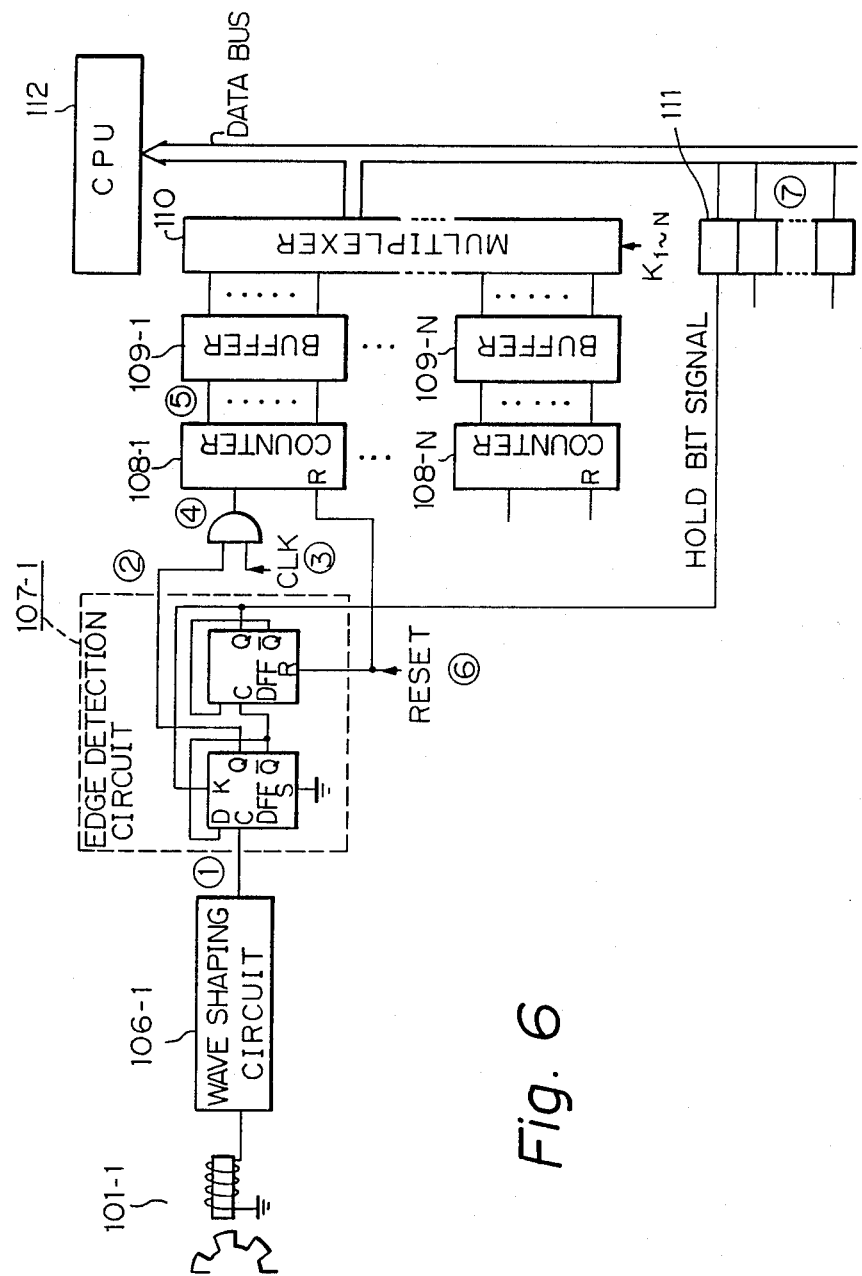
FIG. 6 is a block diagram of a circuit for detecting the wheel speed.
Figure 7:
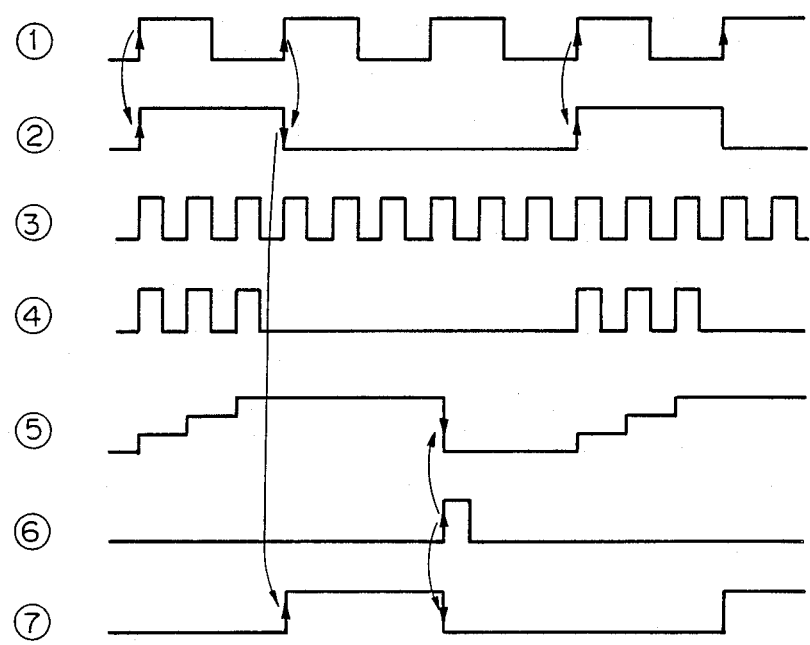
FIG. 7 is a waveform diagram for explaining the function of the circuit of FIG. 6.

An example of the wheel speed measuring means in the anti-skid brake system is described hereinafter with reference to FIGS. 6 and 7. FIG. 6 is a block circuit diagram of the wheel speed measuring means. The circuit comprises a wave shaping circuit 106-1, an edge detection circuit 107-1, counters 108-1 to 108-N, buffers 109-1 to 109-N, multiplexer 110, a hold bit holding circuit 111, and a central processing unit (CPU) 112. The wave shaping circuit 106-1 trims the wave signal of the wheel speed detected by the wheel speed sensor 101-1 into a rectangular pulse signal. The edge detection circuit 107-1 generates a signal corresponding to a cycle of the wheel speed pulses which have been shaped to rectangular pulses by the wave shaping circuit, by using the rising edge or falling edge of the shaped rectangular pulse as a trigger point. Each of the counters 108-1 to 108-N counts clock pulses during one cycle of the rectangular pulse signal output from the edge detection circuit 107-1. The buffers 109-1 to 109-N register the data of the count results output from the counters 108-1 to 108-N. The multiplexer 110 selects the data registered in the buffers 109-1 to 109-N and outputs this data to the data bus. The hold bit holding circuit 111 holds the state of completion of the wheel speed pulse cycle measurement process conducted by the counters 108-1 to 108-N. The CPU 112 scans the hold bit holding circuit 111 and reads out the registered data stored in one of the buffers 109-1 to 109-N corresponding to the hold bit position in the hold bit holding circuit 111, through the multiplexer 110. The CPU 112 then transmits a reset signal ⑥ to reset the edge detection circuit 107-1 and the counters 108-1 to 108-N. The hold bit holding circuit 111 is also reset by resetting the edge detection circuit 107-1. The CPU 112 then transmits a control signal to the anti-skid brake drive means (not shown) to control the anti-skid brake system in response to the read out wheel velocity data.

The function of the circuit of FIG. 6 is further described with reference to FIG. 7. Wave signal ① represents the trimmed pulse signal output from wheel velocity sensor 101-1 and shaped by the wave shaping circuit 106-1. Wave signal ② represents an output signal from the edge detection circuit 107-1 and comprises pulses having a width corresponding to the length of one cycle of the pulses of the wave signal ①. Wave signal ③ represents clock pulses. The time of one cycle of the pulses of signal ① is measured by counting the clock pulses of the wave signal ③. Wave signal ④ represents an input signal transmitted to the counter 1. Wave signal ⑤ is the output signal from the counter 108-1 and represents the count result of the number of pulses of the signal ④. Wave signal ⑥ is a pulse signal for resetting t detection 107-1 and the counter 108-1. Wave signal ⑦ is a registered signal held in the hold bit holding circuit 111. Upon the detection of the setting of a hold bit in the hold bit holding circuit 111, the CPU 112 starts to read out the vehicle speed data registered in one of the buffers 109-1 to 109-N. The CPU 112 then transmits the reset signal ⑥ to reset the edge detection circuit 107-1 and the counter 108-1 so that the measurement of the vehicle speed is started again.

As mentioned above, a hold bit is set in the hold bit holding circuit 111 when the measurement of the wheel speed by the counters 108-1 to 108-N is ended. Therefore, the CPU 112 can read the wheel speed data from one of the buffers 109-1 to 109-N corresponding to the hold bit position in the hold bit holding circuit 111, by scanning the hold bit holding circuit 111 to control the anti-skid brake system.

Figure 8:
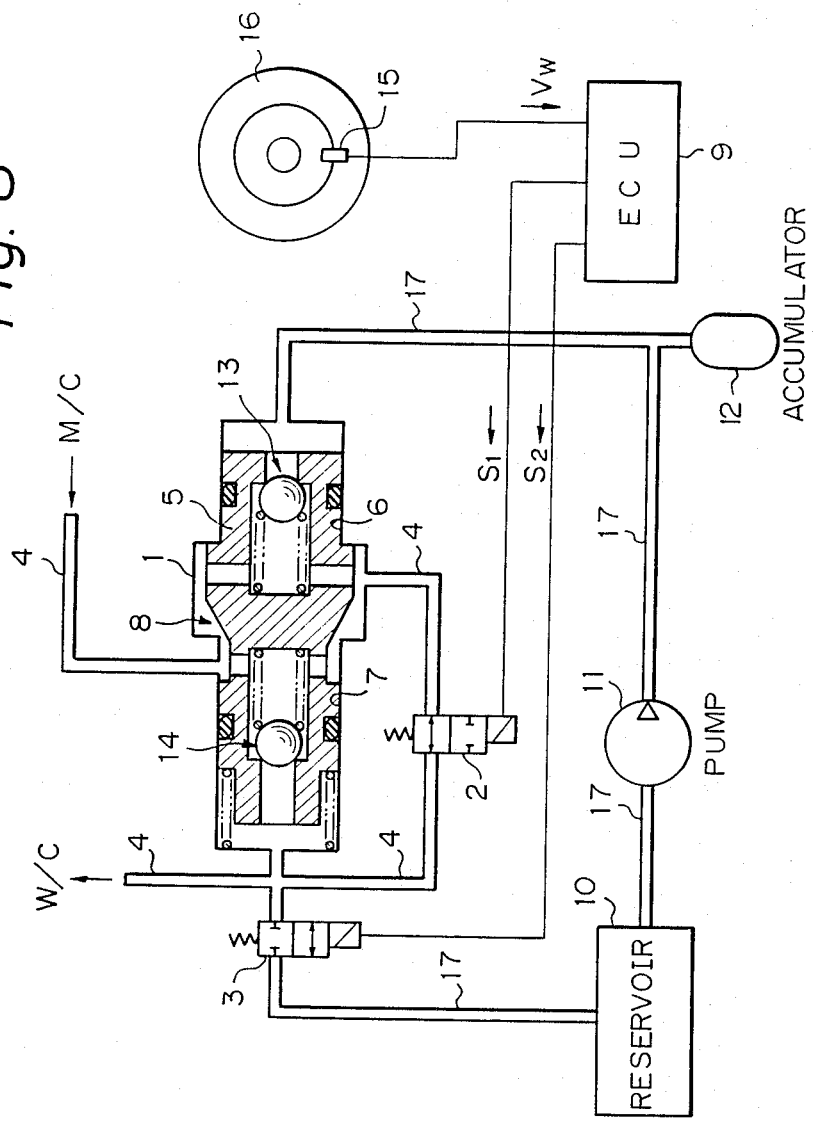
FIG. 8 is a constructional view of an anti-skid brake system to which the present invention is applied.

FIG. 8 illustrates an anti-skid control apparatus to which the present in applicable, and which includes a gate valve 1, a pressure buildup-holding solenoid-operated valve (referred to simply as a pressure valve hereinafter) 2, a pressure-reducing solenoid-operated valve (referred to simply as reducing valve hereinafter) 3, a main fluid passage 4 extending from a master cylinder M/C (not shown) to wheel cylinders W/C of wheel brake devices not shown) through the gate valve 1 and the pressure valve 2, and so forth.

The gate valve 1 includes cylinders 6 and 7 containing a differential pressure-responsive piston 5 which is arranged to close a valve portion 8 of the gate when the piston 5 is displaced to the left in the drawing due to a pressure difference. Upon closure of the valve portion 8, the main passage 4 extending between the master cylinder M/C and the wheel cylinder W/C is interrupted.

The pressure valve 2, which is normally open, is closed in response to a brake fluid pressure holding signal $S_1$ derived from a control circuit (electronic control unit) 9, and thereupon, the main passage 4 is interrupted so that a brake fluid pressure holding condition is established.

The reducing valve 3, which is normally closed, is opened in response to a pressure-reducing signal $S_2$ also derived from the control circuit 9, and thereupon, pressure fluid in the wheel cylinder W/C is pumped into an accumulator 12 by means of a pump 11 through a reservoir 10. The thus pumped pressure fluid is returned between the gate valve 1 and the pressure valve 2 through a by-pass passage 17. Indicated at 13 and 14 are a check valve and relief valve, respectively.

A wheel velocity detector or speed sensor 15 is associated with a wheel 16 and arranged to provide detected information to the control circuit 9.

A motor vehicle is usually provided with a pair of anti-skid control systems, each being as shown in FIG. 8; one for controlling two wheels, such as front left and rear right wheels, and the other for controlling the remaining two wheels, such as front right and rear left wheels.

The control circuit 9 comprises a microcomputer which functions as described hereinafter with reference to FIGS. 9 and 10.

Figure 10:
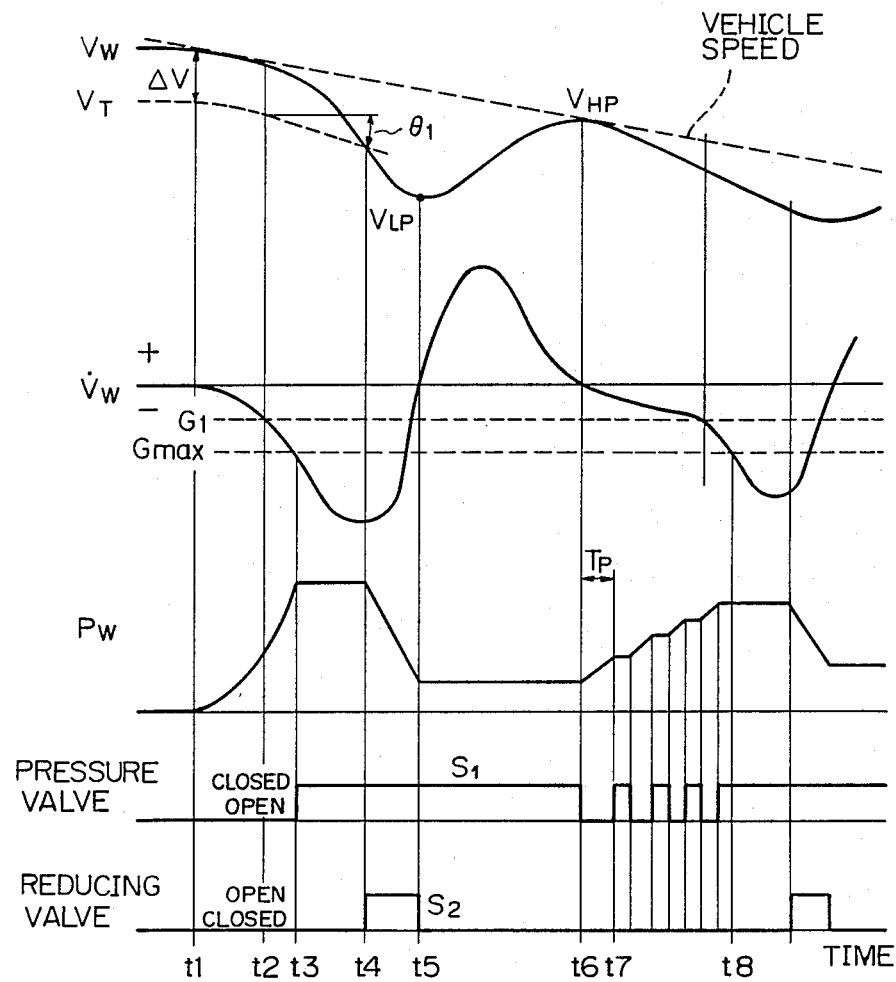
FIG. 10 is a graphical view and waveform diagram for explaining the function of the anti-skid brake system to which the present invention is applied.

FIG. 10 shows the wheel speed $V_W$, wheel acceleration or deceleration $\dot{V}_W$ (differential of the wheel speed $V_W$), brake fluid $P_W$ within the wheel cylinder W/C of the brake system, and the opening and closing timing of the pressure valve 2 and the reducing valve 3.

Typically, during time period from $t_1$ to $t_n$ shown in FIG. 10, the below-described control operations are performed by the control circuit of FIG. 9 in accordance with variations in the wheel speed $V_W$ detected by the speed sensor 15 shown in FIGS. 8 and 9. The wheel deceleration $\dot{V}_W$ is determined by a wheel deceleration detector unit 51 (FIG. 9) on the basis of the wheel speed $V_W$. The wheel deceleration $\dot{V}_W$ thus determined is then compared with a preset threshold level $G_1$ in a first comparator 52, and with another preset threshold level $G_{max}$ in a second comparator 53.

Time $t_1$: When a braking operation is started, the brake fluid pressure $P_W$ builds up so that the wheel deceleration $\dot{V}_W$ increase gradually.

A reference velocity $V_T$ is determined, based on the wheel speed $V_W$, in a reference velocity determination unit 54 (FIG. 9) which is controlled based on the output of the first comparator 52 in such a manner that $V_T$ is $\Delta V$ lower than $V_W$ and that the reduction rate of the reference velocity $V_T$ does not exceed a predetermined value $\theta_1$ which corresponds to the threshold level $G_1$.

Time $t_2$: When the wheel deceleration $\dot{V}_W$ reaches the threshold level $G_1$, an output signal "2" is derived from the first comparator 52, and the reference velocity $V_T$ decreases with the constant gradient $\theta_1$.

Time $t_3$: As the wheel deceleration $\dot{V}_W$ further increases, it reaches the threshold level $G_{max}$, and thereupon, the second comparator 53 provides an output signal "1" which in turn is passed through a first timer 55 to set a third flip-flop 79, which provides a signal through a first OR gate 56 to close the first valve 2. Therefore, the brake fluid pressure $P_W$ does not increase and maintains a constant value, as can be seen from the graph of $P_W$ in FIG. 10.

The threshold $G_{max}$ is preset to prevent a further buildup of th fluid pressure $P_W$ when the wheel deceleration $\dot{V}_W$ increases beyond this threshold level.

At the beginning of the time $t_3$, the master cylinder M/C is isolated from the wheel cylinder W/C so that the brake fluid pressure $P_W$ prevailing within the wheel cylinder W/C is held constant. If $G_{max}$ is not detected even when a preset time has elapsed after the time when the signal "1" appeared, the timer 55 operates to block the signal "1".

Time $t_4$: When the wheel speed $V_W$ and reference velocity $V_T$ become equal to each other, the first flip-flop 58 is set and provides an output signal "3" which in turn is passed through a second timer 59 and a first AND gate 62 to cause the reducing valve 3 to be opened so that the brake fluid pressure $P_W$ within the wheel cylinder W/C is reduced, as represented by the line $P_W$ in FIG. 10.

If the output signal "3" still exists when a present time has elapsed after the time when this signal appeared, the second timer 59 operates to block the signal "3", thus causing the reducing valve 3 to be closed. In this way, the pressure reduction is prevented from continuing for longer than necessary.

A second flip-flop 61 is set by the signal "3". The output signal of the second flip-flop 61 is provided to the reducing valve 3 through the first AND circuit 62. The flip-flop 61 is arranged to be reset, when a preset time has elapsed from the time when the pressure valve 2 was closed, by the output of a delay timer 63 which enables a start of the operation thereof by the output signal "3"; with this arrangement, the anti-skid control system can be returned to the initial condition. This is based on the fail-safe concept, and the time preset in the delay timer 63 is selected to be sufficiently larger than one control cycle (the period from the time when a pressure reduction occurs to the next time when a pressure reduction occurs again).

Time $t_5$: When the wheel speed $V_W$ reaches a low peak $V_{LP}$, then a low peak detector 60 provides an output signal "4", which in turn is passed to reset the first flip-flop 58. Consequently, the output signal "3"

disappears, and thus the reducing valve 3 is closed. Therefore, the reduction of the brake fluid pressure $P_W$ stops and the pressure $P_W$ becomes constant.

As a consequence of the above-described operations, the brake fluid pressure $P_W$ within the wheel cylinder W/C is held constant (from $t_3$) reduced (from $t_4$), and again held constant (from $t_5$), and the pressure holding operation performed after the time $t_5$ is continued until a high peak of the wheel speed $V_W$ is detected at time $t_6$. Thus, the braking forces are reduced so that the wheel speed $V_W$ is sufficiently recovered.

Time $t_6$: When the wheel speed $V_W$ reaches a high peak $V_{HP}$, a high peak detector 66 provides an output signal "5", which in turn is passed to a store circuit 65 so that a pressure buildup time ($T_P$) corresponding to the average acceleration computed in a logic unit 64 is read out. The polarity of the output signal of the store 65 is reversed by an inverter 67 so as to be converted to an output signal "6", which in turn appears at the output of the first OR circuit 56 through a second AND circuit 68. Thus the pressure buildup/holding signal $S_1$ disappears after the time ($T_P$). In this way, during the time ($T_P$), the pressure valve 2 is opened so that the brake fluid pressure $P_W$ builds up.

Time $t_7$: The pressure valve 2 is closed to maintain a constant brake fluid pressure for the time determined in response to the state of the deceleration during the time period $T_P$. Then the pressure valve 2 is repeatedly opened and closed, to gradually increase the brake fluid pressure $P_W$ as represented in FIG. 10. When the deceleration value reaches $G_{max}$ (Time $t_8$), the pressure valve 2 is closed again to hold the brake fluid pressure constant. The above mentioned processes from the time $t_3$ are then repeated.

Figure 11:
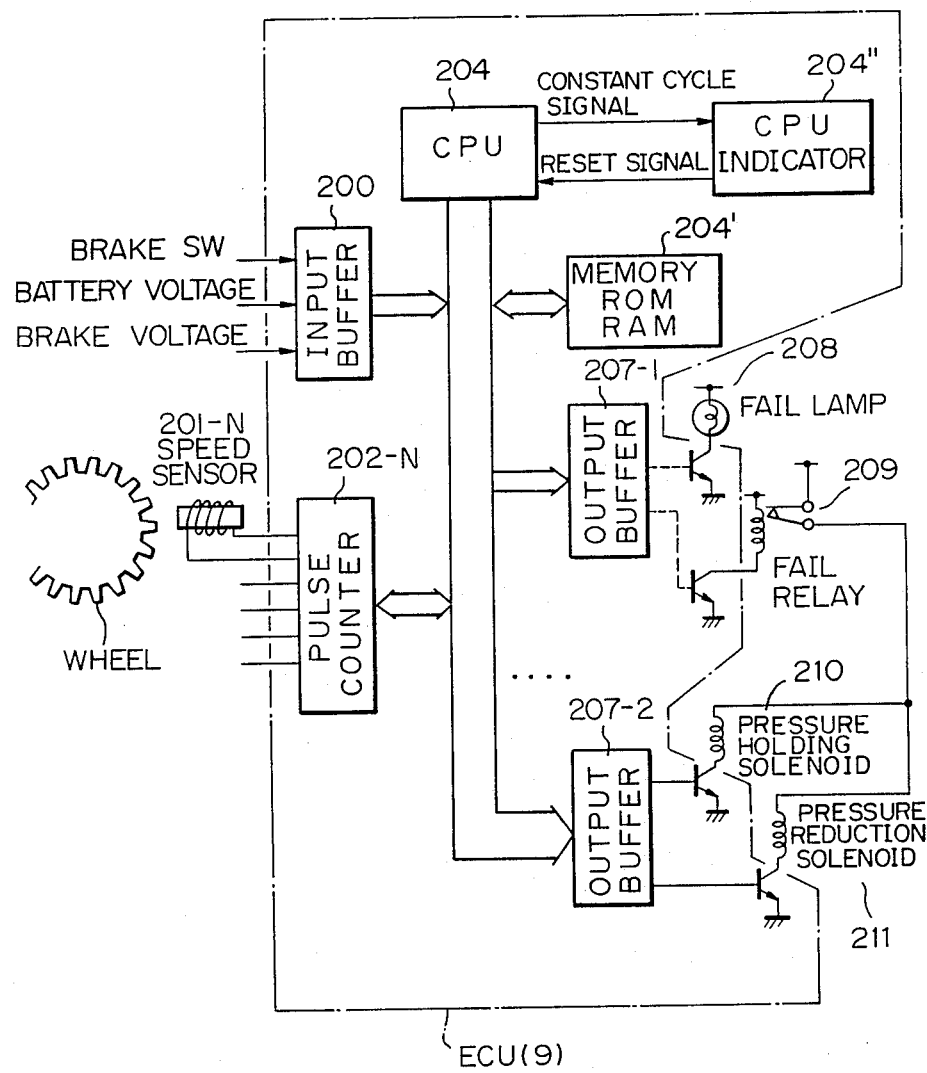
FIG. 11 is a block diagram for explaining the construction of the anti-skid brake system according to the present invention; and, FIG. 12 is a graphical view for explaining the function of the present invention.

FIG. 11 is a block diagram of the anti-skid brake control system of the present invention. A brake switch signal, battery voltage signal, and brake voltage signal are input to the CPU 204 through an input buffer 200, and wheel speed sensors 201-N are connected to a pulse counter 202-N which is connected to the CPU 204. The CPU 204 calculates wheel speed, acceleration, and deceleration in accordance with the calculation sequence registered in a memory 204, by the command of an indicator circuit 204″, using the input data from the pulse counter 202-N. If an abnormal signal is input through the buffer 200, the indicator 204″ turns on a fail lamp 208 through an output buffer 207-1 and drives a fail relay 209 to stop the operation of the anti-skid brake system and thereby operate only the ordinary brake system. The CPU 204 drives a pressure holding solenoid 210 and a pressure reduction solenoid 211 through an output buffer 207-2 in accordance with the calculation results. The pressure holding solenoid 210 is interconnected to the afore-mentioned pressure valve, and the pressure reduction solenoid 211 is interconnected to the afore-mentioned reducing valve. The afore-mentioned anti-skid brake control is conducted by driving the solenoid 210 and 211 to open or close the pressure valve and the reducing valve respectively.

An object of the present invention is to avoid malfunctions of the anti-skid brake control system due to noise which appears in the detected wheel velocity data. This function of avoiding a malfunction is described further with reference to FIG. 12. A noise N appears on the wheel velocity curve $V_W$. Therefore, the differential curve $\dot{V}_W$ thereof has a noise wave $\dot{N}$. In this differential curved $\dot{V}_W$, the time of a period wherein the deicer of the wheel is more than a predetermined value $G_N$ measured. This time, due to the noise, is represented as $t'_n$, whereas the time due to an actual deceleration by the braking operation is represented as $t'_a$. The time $t'_n$ of the noise is relatively short, whereas the time $t'_a$ of an actual deceleration is long. When this time is longer than a predetermined time ($T'_N$ of FIG. 2), the CPU determines that the calculated d is due to an actual deceleration by the braking operation. On the other hand, if this time is than the predetermined time, the CPU determine the calculated deceleration is derived from the noise N.

The wheel velocity $V_W$ has a low peak $N_{LP}$ of the noise N. This low peak $N_{LP}$ is discriminated from the actual low peak $V_{LP}$ due to the braking operation, as follows. The CPU measures the time of a period wherein the deceleration is less than a predetermined value $G_L$. Namely, the CPU measures the time from the point $G_L$ to the point of the low peak (the deceleration value is zero). This time $t_n$ of the noise low peak $N_{LP}$ is short, whereas the time $t_a$ of the actual low peak $V_{LP}$ is long. If the time before the low peak reaches a predetermined value ($T_N$ of FIG. 3), the CPU determines that the calculated low peak is derived from an actual deceleration due to the braking operation. Whereas, if the time before the low peak is less than the predetermined value, the CPU determines that the calculated low peak is derived from the noise N.

Figure 2:
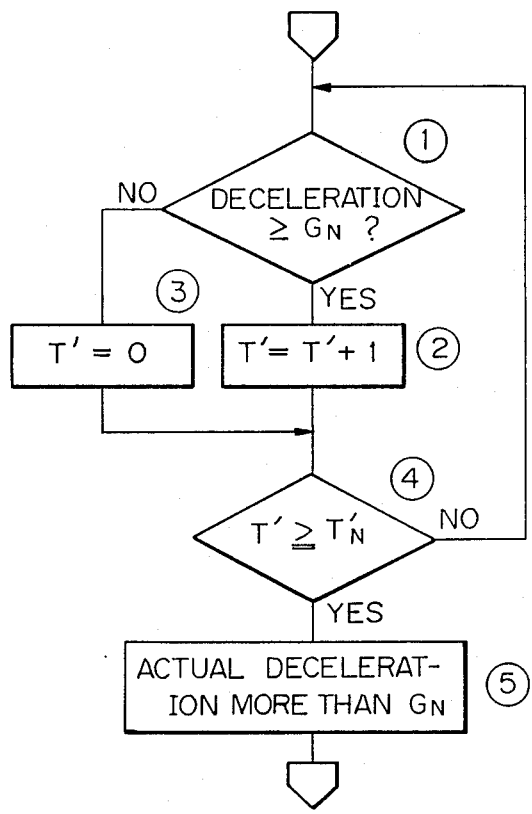
FIG. 2 is a flow chart of the process of discriminating an actual deceleration state according to the present invention.
Figure 3:
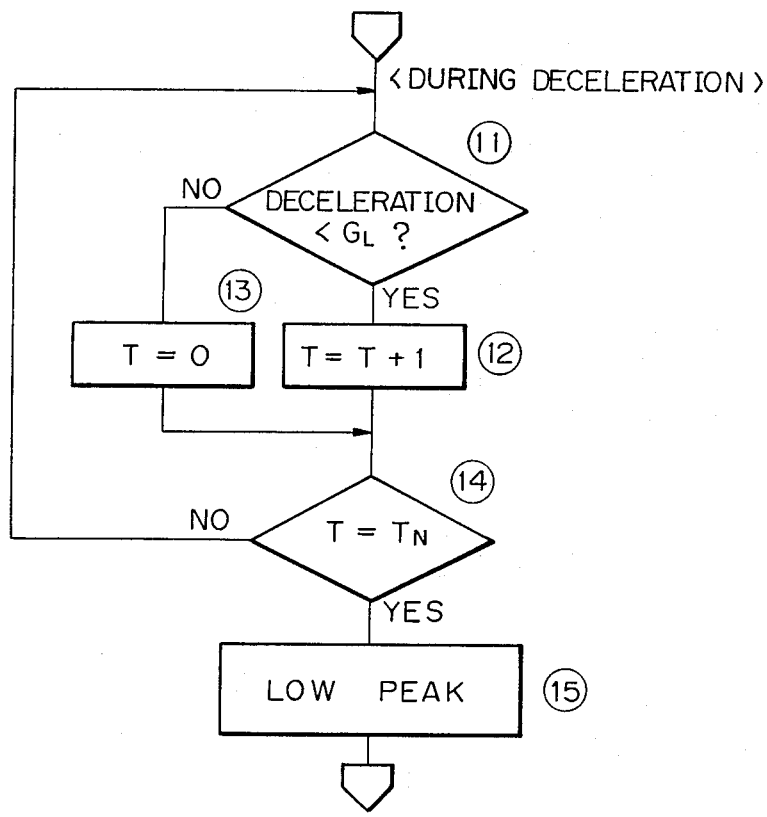
FIG. 3 is a flow chart of a process of discriminating the low peak of the wheel speed according to the present invention.
Figure 4:
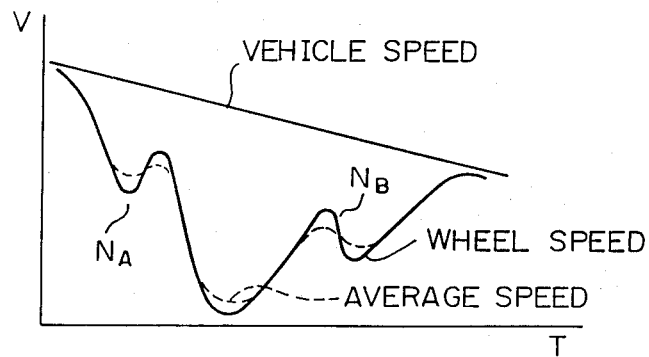
FIG. 4 is a graphical view representing a wheel speed curve with noise.
Figure 5:
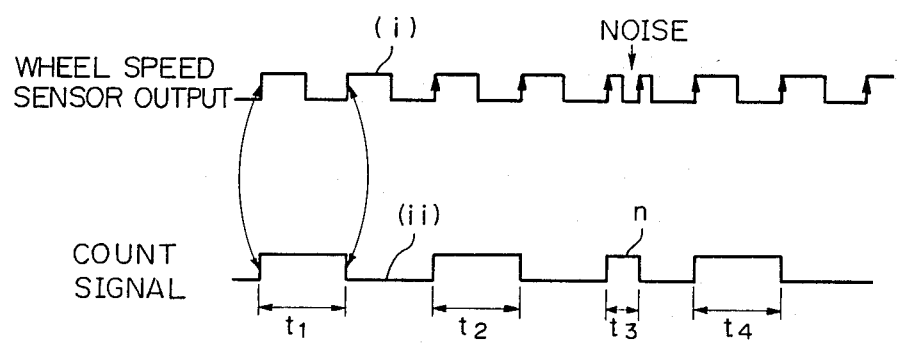
FIG. 5 is waveform diagram showing a relationship between the wheel speed sensor output and the detection signal from the detector of the wheel speed sensor output.

Such a deceleration judgment process is represented in the flow charts of FIGS. 2 and 3. In step ① of FIG. 2, the calculated deceleration is compared with the predetermined value $G_N$. If the wheel deceleration (negative acceleration) is larger than $G_N$, the count number T′ (number of clock pulses) registered in a register of the discrimination means 203 (FIG. 1) is incremented in step ② and then step ④ is conducted. On the other hand, calculated deceleration is below $G_N$, the count T′ is cleared to zero in step ③ and then step ④ is conducted.

In step ④, the time corresponding to a count number T′ registered in the register is compared with a predetermined valve T′. Namely, the time of the period wherein deceleration is equal to or more than $G_N$ is compared with the predetermined time $T'_N$. $T'_N$ is determined to be larger than the time due to noise so that the calculated deceleration state derived from the noise is discriminated. If T′ is larger than the predetermined value $T'_N$, the CPU (discrimination means 203 in the CPU of FIG. 1) determines that the calculated deceleration state is derived from an actual deceleration due to the braking operation in step ⑤. If the T′ is less than $T'_N$, the steps from step ① are repeated.

As mentioned above, if the deceleration state of more than $G_N$ continues for more than the time $T'_N$, the deceleration state is regarded as an actual deceleration state and discriminated from the deceleration state due to the noise N. The controller 205 of FIG. 1 performs an optimal anti-skid control operation in accordance with the discriminated actual deceleration data.

A similar discrimination process is conducted to discriminate an actual acceleration state from an acceleration state due to noise.

A process for discriminating the actual peak of the velocity curve is described in detail with reference to FIG. 3. In step ⑪ of FIG. 3, the calculated deceleration is compared with predetermined value $G_L$. If the deceleration value is than $G_L$, the count number T (number of clock pulse registered in the register of the discrimination 203 of FIG. 1 is incremented in step ⑫ and then step ⑭ is conducted. On the other hand, if the deceleration value is more than $G_L$, the count number T is cleared to zero, and then step ⑭ is conducted.

In step ⑭, the time corresponding to the count number T is compared with a predetermined value $T_N$. If the number T is equal to $T_N$, the calculated deceleration state is determined to be the actual low peak ($V_{LP}$ of FIG. 12) in step are. On the other hand, if the number T is below $T_n$, the steps from step ⑪ are repeated.

As mentioned above, the calculated deceleration low peak data is regarded as the actual low peak, discriminated as the actual low peak and discriminated from the low peak due to noise, when the deceleration state below $G_N$ continues for the predetermined time $T_N$. The controller 205 of FIG. 1 performs an optimal anti-skid control in accordance with the calculated data of the actual low peak.

A similar discrimination process is conducted to discriminate an actual acceleration high peak from a high peak due to noise.

Figure 9:
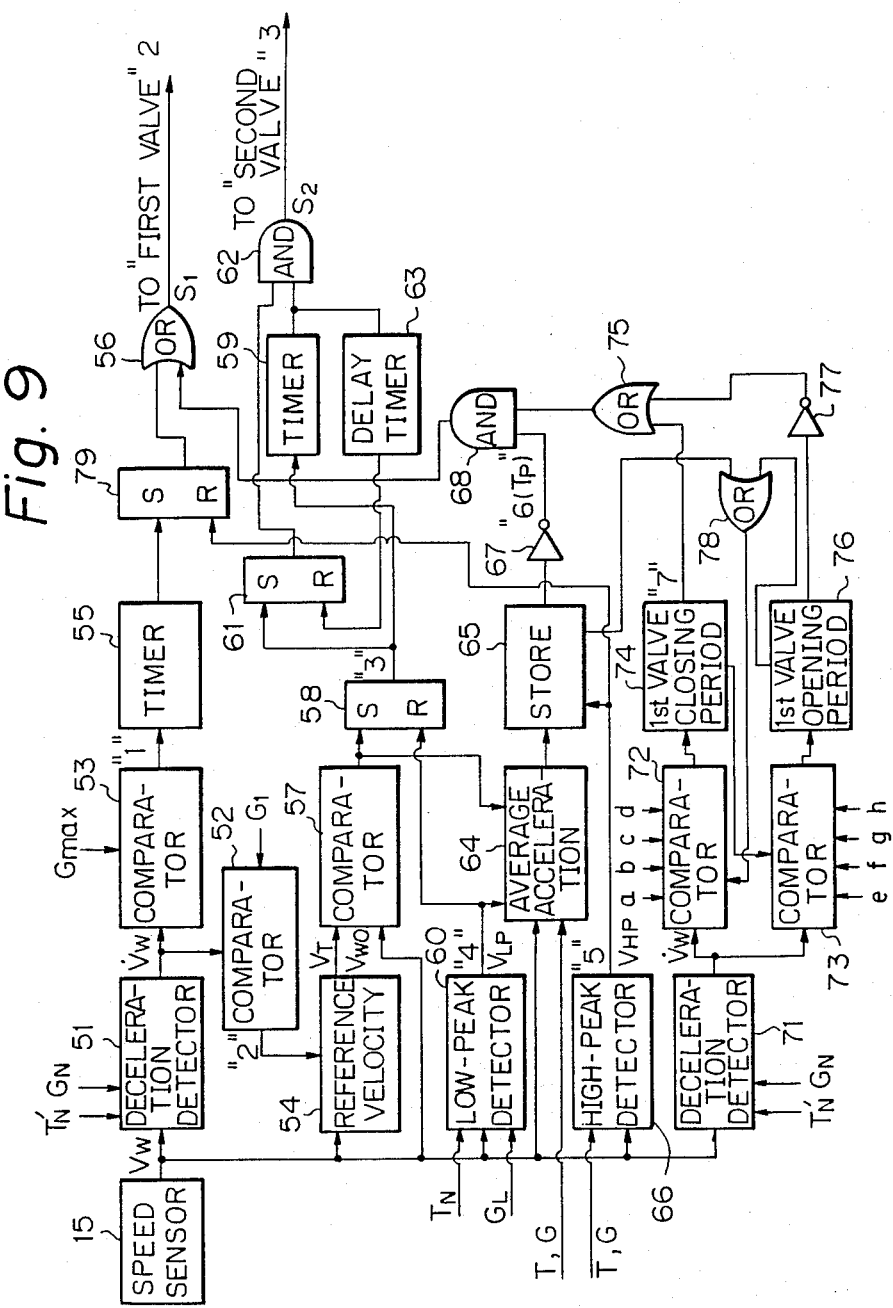
FIG. 9 is a block diagram of a circuit for controlling the anti-skid brake system according to the present invention.

The above mentioned predetermined values $G_N$ and $T'_N$ are input from the CPU to the deceleration detectors 51, 71 of FIG. 9 to discriminate the actual deceleration state. Also, the predetermined values $G_L$ and $T_N$ are input from the CPU to the low peak detector 60 of FIG. 9 to discriminate the actual low peak. Also, predetermined values T, G (corresponding to $T_N$, $T'_N$, $G_N$ and $G_L$) for discriminating the actual acceleration state and actual high peak are input from the CPU to the average acceleration detector 64 and the high peak detector 66.

We claim:

1. An anti-skid brake control system for a motor vehicle having an acceleration state and a deceleration state, said anti-skid brake control system comprising:
    wheel speed sensor means, operatively connectable to each wheel of the motor vehicle, for generating pulse signals having pulse cycles which correspond to a revolutional speed of each wheel;
    pulse cycle measuring means for detecting the pulse cycles of said pulse signals from said wheel speed sensor means and for providing a detected wheel velocity signal;
    calculating means for receiving said velocity signal and calculating at least one of the acceleration and deceleration states from said velocity signal; and
    discrimination means for determining if a period of said calculated one of the acceleration and deceleration states is longer than a predetermined time when said calculated one of the acceleration and deceleration states is greater than a predetermined threshold value, said discrimination means discriminating said calculated one of the acceleration and deceleration states as noise when the period is shorter than the predetermined time, said anti-skid brake control system providing anti-skid control for the motor vehicle dependent upon discrimination of noise from said detected wheel velocity signal by said discrimination means.

2. An anti-skid brake control system according to claim 1, wherein said pulse cycle measuring means is operatively connectable to receive clock pulses and comprises means for counting a number of the clock pulses occurring during one cycle of said pulse signals from said wheel speed sensor means ad wherein said discrimination means is operatively connectable to receive the clock pulses and comprises means for counting a number of the clock pulses occurring during the period of said calculated one of the acceleration and deceleration states to determine if the period is longer than said predetermined time.

3. An anti-skid brake control system for a motor vehicle having acceleration and deceleration states, said anti-skid control system comprising:
    wheel speed sensor means operatively connectable to each wheel of the motor vehicle, for generating pulse signals having pulse cycles which correspond to a revolutional speed of each wheel;
    pulse cycle measuring means for detecting and measuring the pulse cycles of said pulse signals from said wheel speed sensor means and providing a detected wheel velocity signal;
    calculating means for receiving said velocity signal and calculating at least one of the acceleration and deceleration states from said velocity signal; and
    discrimination means for determining if a period of said calculated one of the acceleration and deceleration states is longer than a predetermined time when said calculated one of the acceleration and deceleration states is less than a predetermined threshold value, said discrimination means discriminating said calculated one of the acceleration and deceleration states as noise when the period is shorter than the predetermined time, said anti-skid brake control system providing anti-skid control for the motor vehicle dependent upon discrimination of noise from said detected wheel velocity signal.

4. An anti-skid control system according to claim 3, wherein said pulse cycle measuring means is operatively connectable to receive the clock pulses and comprises means for counting a number of the clock pulses occurring during one cycle of said pulse cycles from said wheel speed sensor means and wherein said discrimination means is operatively connectable to receive the clock pulses and comprises means for counting a number of the clock pulses occurring during the period and comparing the period to the predetermined time.

5. An anti-skid brake control system having an electronic control unit operatively connectable to receive a brake switch signal, a brake voltage signal, a battery voltage signal and a velocity signal, said electronic control unit having a pulse count signal and comprising:
    central processor unit means receiving the brake switch signal, the brake voltage signal, the battery voltage signal and the pulse count signal, for calculating wheel speed, an acceleration state and deceleration state, discriminating the calculated acceleration and deceleration states from noise in accordance with predetermined time values and predetermined acceleration/deceleration threshold levels, and generating control signals for performing anti-skid control functions responsive to at least one of the discriminated calculated acceleration and deceleration states;
    pulse counter means receiving the velocity signal, for deriving the pulse count signal on the basis of the received velocity signal and providing the pulse count signal to said central processor unit means;
    memory means storing data including calculation sequences, for providing the data and calculation sequences to said central processor unit means;
    input buffer means receiving and providing the brake switch signal, the brake voltage signal and the battery voltage signal to said central processor unit means;

output buffer means receiving said control signals, for providing said control signals as at least a failure lamp output signal, a failure relay output signal, a pressure holding solenoid output signal, and a pressure reduction solenoid output signal.

6. An anti-skid brake control system according to claim 5, wherein said central processor unit means controls at least a first valve and a second valve and comprises;

deceleration detector means receiving said velocity signal, for detecting and providing a deceleration signal on the basis of said velocity signal, in accordance with a first predetermined time value and a predetermined deceleration value;

first comparator means receiving said deceleration signal, for providing a first comparator signal in accordance with a predetermined deceleration threshold level;

second comparator means receiving said deceleration signal, for generating a second comparator signal in accordance with a predetermined maximum deceleration threshold level;

reference velocity determination means receiving said velocity signal and said first comparator signal, for generating a reference velocity signal in accordance with said first comparator signal;

third comparator means receiving said velocity signal and said reference velocity signal, for generating a third comparator signal when said velocity signal is equal to said reference velocity signal;

low peak detector means receiving said velocity signal, for generating and providing a low peak signal in accordance with a second predetermined time value and a second predetermined deceleration value;

high peak detector means receiving said velocity signal, for generating a high peak signal in accordance with a third predetermined time value and third predetermined deceleration value; and average acceleration logic means receiving said velocity signal, the third predetermined tim value, the third predetermined threshold value and said low peak signal, for generating an average acceleration value signal varying in accordance with said velocity signal, dependent upon the third predetermined time value signal, the third predetermined deceleration value, said low peak signal and said third comparator signal, said central processor unit means controlling at least the first valve and the second valve in accordance with at least said second comparator signal, said third comparator signal, said low peak signal, and said high peak signal.

* * * * *

UNITED STATES PATENT AND TRADEMARK OFFICE
CERTIFICATE OF CORRECTION

PATENT NO. : 4,870,582
DATED : September 26, 1989
INVENTOR(S) : Akira Hoashi et al.

It is certified that error appears in the above-identified patent and that said Letters Patent is hereby corrected as shown below:

On the title page:

FRONT PAGE [73] Assignee, delete this section and insert the correct section:
--[73] Assignee: Fujitsu Limited, Kawasaki; and Akebono Brake Industry Co., Ltd., Tokyo; both of Japan--.

Col. 1, line 16, "si" should be --is--.

Col. 2, line 67, "is waveform" should be --is a waveform--.

Col. 4, line 58, "counter 1." should be --counter 108-1.--;
line 61, "t detection" should be --the edge detection circuit--.

Col. 5, line 12, "present in" should be --present invention is--.

Col. 6, line 28, "th" should be --the brake--.

Col. 7, line 9, "$t_6$" should be --$t_6$.--;
line 43, "204," should be --204'--;
line 68, "deicer" should be --deceleration--.

UNITED STATES PATENT AND TRADEMARK OFFICE
CERTIFICATE OF CORRECTION

PATENT NO. : 4,870,582

DATED : September 26, 1989

INVENTOR(S) : Akira Hoashi et al.

It is certified that error appears in the above-identified patent and that said Letters Patent is hereby corrected as shown below:

Col. 8, line 1, "$G_N$ measured" should be --$G_N$ is measured--;

line 7, "d" should be --deceleration--;

line 35, after "hand," insert --if the--;

line 40, "T'." should be --$T'_N$.--;

line 65, "is than" should be --is less than--;

line 66, "pulse" should be --pulses)--;

line 67, "nation 203" should be --nation means 203--.

Col. 9, line 7, "step are." should be --step (15).--;

line 8, "$T_n$," should be --$T_N$,--;

UNITED STATES PATENT AND TRADEMARK OFFICE
CERTIFICATE OF CORRECTION

PATENT NO. : 4,870,582      Page 3 of 3
DATED : September 26, 1989
INVENTOR(S) : Akira Hoashi et al.

It is certified that error appears in the above-identified patent and that said Letters Patent is hereby corrected as shown below:

line 13, "$T_N.$" should be --$\dot{T}_N.$--;
        line 64, "ad" should be --and--.

Col. 12, line 15, "tim" should be --time--.

Signed and Sealed this

Ninth Day of April, 1991

Attest:

HARRY F. MANBECK, JR.

*Attesting Officer*      *Commissioner of Patents and Trademarks*